April 18, 1961 J. E. HALLIDAY, JR., ET AL Re. 24,970

METHOD OF KNITTING COMBINATION PANTIE GIRDLE

Original Filed Oct. 1, 1957

INVENTORS.
JOHN E. HALLIDAY, Jr.
BY MARTIN H. FAUST

Louis Neches
ATTORNEY

United States Patent Office

Re. 24,970
Reissued Apr. 18, 1961

24,970

METHOD OF KNITTING COMBINATION PANTIE GIRDLE

John E. Halliday, Jr., Reading, Pa., and Martin H. Faust, Hopatcong, N.J. (both % Penn Dale Knitting Mills, Sinking Springs, Pa.)

Original No. 2,952,149, dated Sept. 13, 1960, Ser. No. 687,534, Oct. 1, 1957. Application for reissue Oct. 17, 1960, Ser. No. 63,233

3 Claims. (Cl. 66—177)

Matter enclosed in heavy brackets [ ] appears in the original patent but forms no part of this reissue specification; matter printed in italics indicates the additions made by reissue.

This invention relates to a girdle, and to a combination pantie-girdle.

A girdle, as distinguished from an ordinary pantie, is intended to possess a certain degree of compressive capacity so that it may lend support to the portions of the body enclosed thereby. To this end it has been customary to knit a girdle of this type from rubber yarns covered by a suitable natural, or synthetic filament.

A girdle thus made has a rough feel which the feminine wearers of these garments find rather scratchy and uncomfortable.

One object of this invention is to produce a garment which has a soft feel as well as the desird compressive or supporting capacity.

Another object of this invention is to produce a combination pantie-girdle which will possess a comfortable feel, a high degree of stretchability, and a high degree of compressive capacity.

The full nature of the invention will be understood from the following specification and the accompanying drawing in which.

Figure 1:
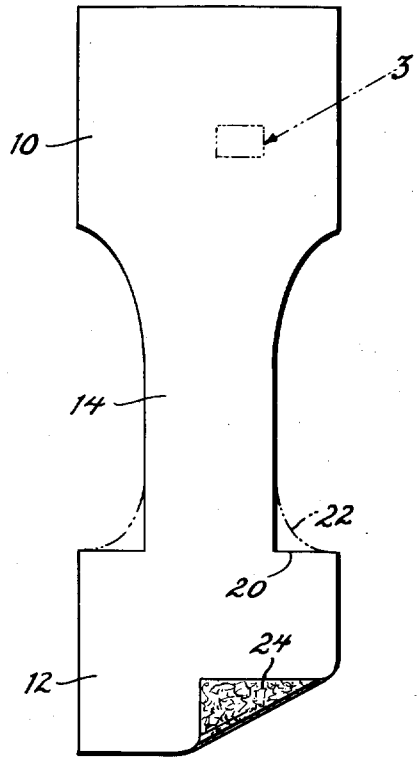
Fig. 1 is a plan view of a blank from which a pantie-girdle embodying my invention is produced.

When intended to form a pantie-girdle, as illustrated in the drawings, the blank from which the garment is made includes a relatively wide portion 10 which ultimately forms the back panel, a relatively wide portion 12, which ultimately forms the front panel, and a relatively narrow intermediate portion 14, which ultimately forms the interconnecting crotch portion of the pantie-girdle.

Conventionally, the blank is knit of plain loop stitches and is fashioned to the desired shape by narrowing the fabric at the junction of panel 12 and crotch 14 and by widening the fabric at the junction of crotch 14 and panel 10. This method is illustrated, for example, in the Garrou et al., Patent No. 2,706,389 of April 19, 1955.

As is well known, the narrowing operation involves movement of the narrowing fingers downwardly, upwardly, laterally, and again downwardly for each cycle and this slows down the production and increases the cost of the garment. Also, a fabric knit of plain loop stitches will run, or ladder, if a stitch breaks, and the curled edges of the fabric make it difficult to sew the edges together to form the garment. In order to overcome this difficulty, it has been proposed, for example, as in the Garrou patent aforesaid, to reinforce the normal selvedges so as to make them more manageable. This expedient does serve the purpose fairly well, but it also correspondingly increases the cost. When the number of garments sold and the price at which each garment is sold are considered, any avoidable increase in the cost of production, no matter how small, can be very serious.

According to our invention, the blank is knit of the locked stitches illustrated at 18 to produce a fabric which does not ladder and the edges of which lie substantially flat or are free of curls so that they can be handled during the sewing operation, without reinforcing the selvedges. Also, making the fabric of non-run stitches makes it possible to narrow the fabric by merely dropping the desired number of needles at the opposite edges of the knitting head so that the fabric is narrowed abruptly, as indicated by solid lines 20 in Fig. 1 instead of progressively, as indicated by broken lines 22. If the fabric is not made of non-run stitches, it is impossible to narrow the fabric by dropping needles as herein proposed because the fabric will run. Also, actual experience has shown that, when a blank so formed is sewed to make the finished garment, the corresponding edges of blanks 10 and 12 will still produce suitable leg openings as shown in Fig. 2.

Figure 2:
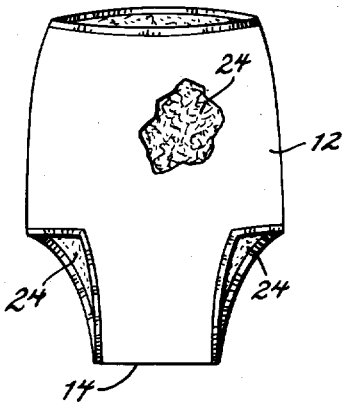
Fig. 2 is a front elevational view of the garment formed from the blank of Fig. 1.
Figure 3:
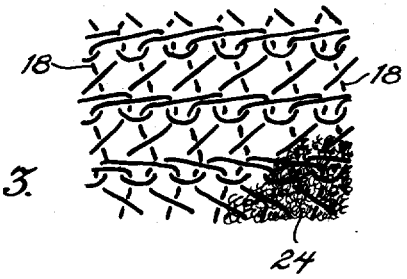
Fig. 3 is an enlargement of the bracketed portion 3 of Fig. 1 showing the construction of the blank.

In order to increase the stretchability of the finished garment beyond that inherent in the elasticity of rubber, the covered rubber yarn is knit under an irreducible measure of tension and, in order to eliminate the objectionable feel of the rubber yarn against the body, the blank of Fig. 1 is plated with a yarn which has a soft feel as diagrammatically shown at 24. The plating may be carried out in the manner shown in Clarke Patent No. 2,370,450, of February 27, 1945, or in any well known manner.

While the fabric can be plated with a highly stretchable yarn, such as the yarn used in the above-mentioned Garrou patent, we prefer to use any one of a number of heat-settable, but inherently non-stretchable yarns which are available on the market. In carrying out the invention, the plating yarn is knit under an irreducible measure of tension so as to produce loose courses formed of large stitches which correspond to the loose courses and large stitches formed of the covered rubber yarn, and the fabric thus formed is subjected to boarding and finishing operations which are well known in the art and are referred to in the Garrou patent, to set the plating yarn in a crinkled or crimped condition so that, when the fabric is stretched, the stretching of the covered rubber yarn is matched by the straightening out of the crimps or crinkles in pre-set plating yarn.

A garment produced as above disclosed will feel soft and delicate against the body, will be stronger, more concealing, more comfortable, more heat insulating, and more absorbing, than a similar garment knit from covered rubber yarn alone. Also, actual tests show that a garment produced as above set forth, is as stretchable as a garment made of rubber yarn alone, or of a highly stretchable synthetic yarn alone, or of a combination of rubber yarn and a highly stretchable yarn.

To form a girdle, as distinguished from a pantie-girdle, the crotch portion 14 is omitted and since this can be done by anyone skilled in the arts, it is thought unnecessary to illustrate or describe the same.

If desired, tabs or loops can be sewn on the opposite sides of each of the leg openings to engage garters or the like.

What we claim is:

*1.* The method of making a pantie-girdle which method consists in knitting the front panel forming portion of the garment of non-run stitches from the waist line to a point near the body bifurcation, simultaneously dropping a large number of stitches at either side of the panel abruptly to narrow the fabric to produce a narrow, substantially rectilinear crotch portion, gradually widening the fabric, knitting the back panel forming portion, folding the blank thus formed along its transverse median line, and sewing the superimposed edges to form the waist and leg openings, said blank being knit of covered rubber yarn.

*2. The method of making a pantie girdle which method consists in knitting the front panel forming portion of the garment of non-run stitches from the waist line to a point near the body bifurcation, simultaneously dropping a large number of stitches at either side of the panel abruptly to narrow the fabric to produce a narrow, substantially rectilinear crotch portion, gradually widening the fabric, knitting the back panel forming portion, folding the blank thus formed along its transverse median line, and sewing the superimposed edges to form the waist and leg openings.*

*3. The method of making a pantie-girdle which method consists in knitting at least the marginal portions of the front panel of the garment adjacent the body crotch of non-run stitches, simultaneously dropping a large number of stitches at either side of the panel abruptly to narrow the fabric to produce a narrow, substantially rectilinear crotch portion, gradually widening the fabric, knitting the back panel forming portion, folding the blank thus formed along its transverse median line, and sewing the superimposed edges to form the waist and leg openings.*

References Cited in the file of this patent or the original patent

UNITED STATES PATENTS

| | | |
|---|---|---|
| 1,965,034 | Gastrich | July 3, 1934 |
| 2,023,882 | Graenz | Dec. 10, 1935 |
| 2,224,871 | Kennedy | Dec. 17, 1940 |
| 2,330,445 | Patton | Sept. 28, 1943 |
| 2,720,097 | De Mond | Oct. 11, 1955 |
| 2,833,134 | Gift | May 6, 1958 |